May 9, 1961   J. F. GRAYSON   2,983,068
RE-USABLE SPLIT SHOT SINKER
Filed Nov. 9, 1959

INVENTOR.
JOHN F. GRAYSON
BY
Knox & Knox

United States Patent Office 2,983,068
Patented May 9, 1961

2,983,068
RE-USABLE SPLIT SHOT SINKER
John F. Grayson, 2968 Redwood, San Diego, Calif., assignor of one-half to David W. Hardin, La Mesa, Calif.
Filed Nov. 9, 1959, Ser. No. 851,625
2 Claims. (Cl. 43—44.89)

The present invention relates generally to fishing line sinkers and more particularly to a re-usable split shot sinker.

The primary object of this invention is to provide a split shot type sinker having bevelled slot faces which define a generally V-shaped groove when the shot is closed over a fishing line or leader, so facilitating removal of the sinker by inserting the thumbnail or fingernail into the groove to pry the sinker open, the sinker being then capable of relocation and re-use.

Another object of this invention is to provide a sinker in which the slot has convex confronting faces converging to a very narrow apex, to ensure maximum gripping effect on the fishing line or leader.

A further object of this invention is to provide a sinker which is made of soft, easily deformable material, so that no tools are required for application or removal of the sinker, even in larger sizes.

Finally, it is an object to provide a split shot type sinker of the aforementioned character which is simple and convenient to make and use and which will give generally efficient and durable service with repeated use.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
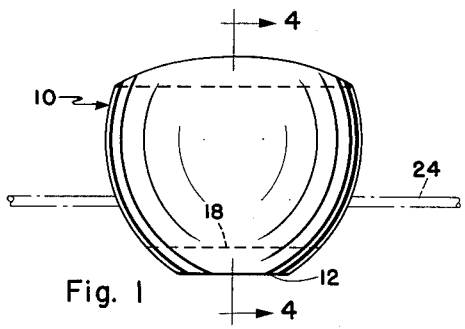
Figure 1 is a side elevation view of a spheroidal form of the sinker, a portion of a fishing leader being indicated in broken lines.

Referring now to Figures 1–4 of the drawing, the first embodiment chosen to illustrate my invention is the sinker 10 which is basically of spheroidal form with a flattened base 12. The sinker 10 is split downwardly substantially on the center line to provide a deep slot 14 having convex confronting faces 16, said slot extending generally diametrically across the sinker, toward but terminating short of the said flattened base 12. The convex faces 16 converge to a narrow apex 18 forming a closed end of the slot, the solid part of the sinker between said apex and said flattened base 12 constituting a hinge portion 20. The opposite edges of the slot 14 have bevelled faces 22 extending outwardly from the convex faces 16.

Existing types of split shot sinkers have slots for the leader to be inserted to the bottom of the slot, the sinker then being squeezed shut over the line or leader. The sinker is retained on the leader, but often does not have sufficient grip to prevent slippage along the leader, unless undue pressure is used to close the sinker. Furthermore, these prior types of sinkers must be removed by inserting a knife or other tool in the slot, with a possibility of damaging the leader.

Figure 2:
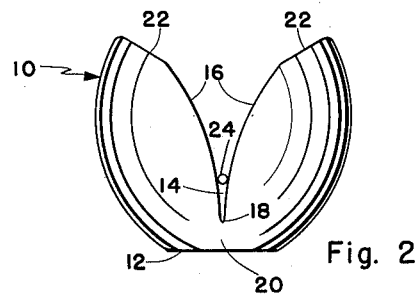
Figure 2 is an end elevation view thereof.
Figure 3:
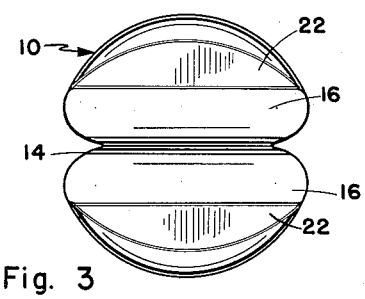
Figure 3 is a top plan view thereof.
Figure 4:
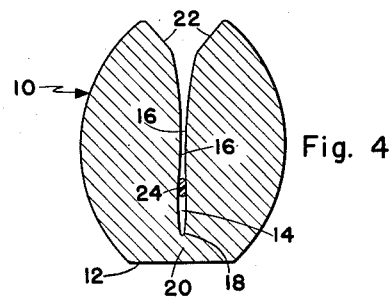
Figure 4 is a sectional view as taken on the line 4—4 of Figure 1, but showing the sinker closed around the leader.

With the sinker 10, the leader 24 is inserted in the slot 14 as far as possible, as indicated in Figure 2, the sinker then being squeezed shut between the fingers and thumb. The sinker is preferably made of pure lead or a soft lead alloy, easily deformable, in order to facilitate manual application. By having the flattened base 12, the thickness of the hinge portion 20 is reduced and accurately controllable in manufacture, and also making the sinker easy to close and open without danger of rupture, at least during several repeated re-locations. In closing the slot 14, the convex faces 16 come together with a rolling motion and hold the leader 24 with a very powerful wedging action, as in Figure 4, very little pressure being required. When closed, the bevelled faces 22 form a generally V-shaped groove or channel into which a thumbnail can be inserted to pry the sinker open when necessary.

When made from a suitably soft material, the sinker 10 is very easy to attach and remove and may be used repeatedly. Even though the sinker is easily deformable the gripping action between the convex faces 16 is sufficient to hold the sinker firmly against displacement, the narrow apex 18 ensuring that the leader 24 cannot be placed in a part of the slot 14 which would result in a loose grip thereon.

Figure 5:
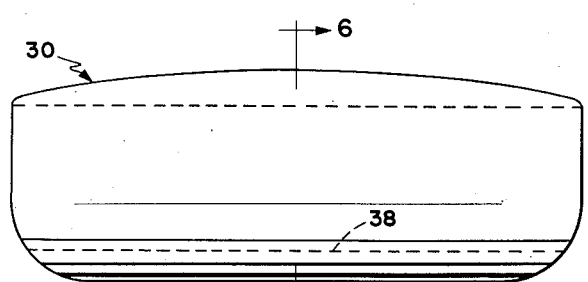
Figure 5 is a side elevation view of an elongated or torpedo type sinker, with this invention incorporated therein.
Figure 6:
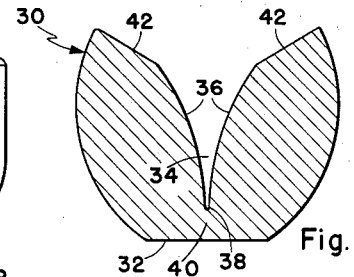
Figure 6 is a sectional view taken on the line 6—6 of Figure 5.

While the sinker 10 is adequate for most uses, extra weight is sometimes required without the necessity of using multiple sinkers. This may be accomplished by the elongated or torpedo type sinker 30, illustrated in Figures 5 and 6, said sinker being generally cylindrical in cross section with a flattened base 32 as in the preceding embodiment. The sinker 30 also has a longitudinal slot 34 with confronting convex faces 36 converging to a narrow longitudinal apex 38, the lower part of the sinker body below said apex forming the hinge portion 40. The convex faces 36 have outwardly extending bevelled faces 42 which form a V-shaped groove when the sinker is closed, the configuration being similar to that illustrated in Figure 4. The sinker 30 extends along the line or leader in the manner of a row of sinkers 10, but is more convenient to use where the extra weight is needed.

Figure 8:
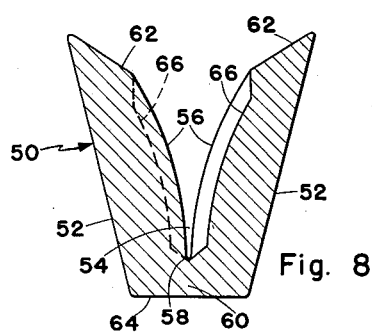
Figure 8 is a sectional view taken on the line 8—8 of Figure 7.
Figure 7:
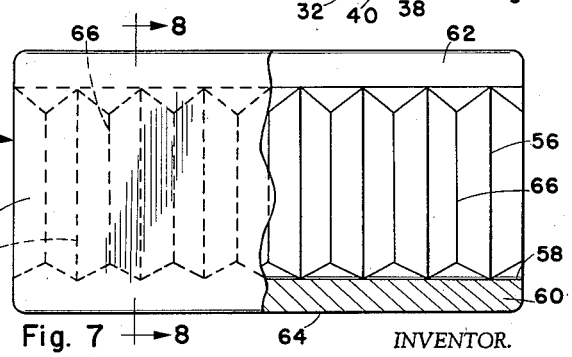
Figure 7 is a side elevation view, partially cut away, of an embodiment which will be referred to as a keel type sinker.

In certain instances, such as in trolling, the lure or bait is not required to spin and some kind of stabilizing action is necessary at the end of the line or on the leader. This can be accomplished by the keel type sinker 50, illustrated in Figures 7 and 8, which has flat sides 52 and is generally of thin rectangular cross section when closed, in the manner of a keel. The sinker 50 has a longitudinal slot 54 having confronting convex faces 56 converging to a narrow apex 58, leaving a hinge portion 60 along the lower portion thereof. At the upper edges of the convex faces 56 are outwardly extending bevelled faces 62 for the above described purpose, and this embodiment also has a flattened base 64. Since the sinker 50 is relatively large and heavy, additional security against slippage under hard usage may be provided by serrations 66 formed in the confronting convex faces 56, said serrations extending generally vertically in the slot 54. The sinker 50 is applied in the same manner as those described above, but is designed to hang below the line or leader to act as a keel and to stabilize the line against rotation or twisting. This is especially advantageous where minimum disturbance of the water is desirable as in trolling with live bait, since such live bait should not cause turbulence in the water and should not spin.

The sinkers may be made in many different sizes and other suitable or convenient shapes will be apparent to those versed in the art. In each of the illustrated sinkers, common, important features will be recognized, particularly the convex confronting faces of the slot which tapers to a very narrow apex, the flattened base and the bevelled upper faces for ease of opening the sinker without tools.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. A split shot type fishing line sinker, comprising: a body of heavy, soft, easily deformable material having a deep slot therein substantially bisecting the body; the sides of said slot being defined by regularly convex confronting faces converging to a narrow apex extending longitudinally of the slot; the ends of said confronting faces remote from said apex having outwardly bevelled portions; said confronting faces having corrugations extending from said apex to said bevelled portions; the portion of said body adjacent said apex constituting a hinge.

2. A split shot type fishing line sinker, comprising: a body of heavy, soft, easily deformable material having a deep slot therein substantially bisecting the body; the sides of said slot being defined by a single pair of regularly convex confronting faces converging to a narrow apex extending longitudinally of the slot; the ends of said confronting faces remote from said apex having outwardly bevelled portions; the portion of said body of adjacent said apex constituting a hinge; said body being generally spheroidal.

References Cited in the file of this patent

UNITED STATES PATENTS

| | | |
|---|---|---|
| 192,789 | Peteler | July 3, 1877 |
| 1,928,536 | Heinlen et al. | Sept. 26, 1933 |
| 2,676,377 | Garcia | Apr. 27, 1954 |
| 2,701,427 | Vironda | Feb. 8, 1955 |
| 2,791,925 | Peters | May 14, 1957 |
| 2,904,924 | Tashiro | Sept. 22, 1959 |

FOREIGN PATENTS

| | | |
|---|---|---|
| 479,258 | Italy | Mar. 21, 1953 |